United States Patent [19]
Bishop

[11] 3,855,303
[45] Dec. 17, 1974

[54] ISOMERIZATION OF ALPH-EPOXIDES

[75] Inventor: Clyde E. Bishop, Indianapolis, Ind.

[73] Assignee: Continental Oil Company, Ponca City, Okla.

[22] Filed: Apr. 24, 1972

[21] Appl. No.: 246,857

Related U.S. Application Data

[63] Continuation-in-part of Ser. No. 46,515, June 15, 1970, abandoned.

[52] U.S. Cl.......... 260/593 R, 260/592, 260/586 R, 260/599, 260/601 R, 260/598
[51] Int. Cl............................................. C0c7 49/04
[58] Field of Search........ 260/586 R, 586 A, 593 R, 260/592, 601 R, 598

[56] References Cited
UNITED STATES PATENTS
3,255,258   6/1966   Charles et al............. 260/593 R X
3,542,883   11/1970   Neriteseu et al........... 260/593 R X

OTHER PUBLICATIONS
B. Rickbon et al., J.A.C.S., 90, 4193–94 (1968).
D. Bissing et al., J.A.C.S., 87, 1405–1406 (1965).

*Primary Examiner*—Leon Zitver
*Assistant Examiner*—James H. Reamer
*Attorney, Agent, or Firm*—Bayless E. Rutherford, Jr.

[57] ABSTRACT

A process for isomerizing $\alpha$-epoxides to yield predominantly aldehyde, along with a lesser amount of ketone. $\alpha$-epoxides lacking a tertiary center in the epoxide moiety are contacted at a temperature of from about 50°C to about 250°C with a catalyst system consisting essentially of an alkali metal perchlorate compound and a triarylphosphine oxide compound, or a trialkylphosphine oxide compound.

12 Claims, No Drawings

ISOMERIZATION OF ALPH-EPOXIDES

This application is a continuation-in-part of application Ser. No. 46,515, by Clyde E. Bishop, filed June 15, 1970, entitled "Isomerization of α-Epoxides", and now abandoned.

BACKGROUND OF THE INVENTION

1. Field of the Invention

This invention relates to the isomerization of epoxide compounds, and more particularly, to catalyzed rearrangement of certain α-epoxides to yield predominantly aldehyde.

2. Brief Description of the Prior Art

It has been heretofore known that epoxide compounds can be caused to undergo rearrangement to carbonyl compounds in the presence of certain catalyst systems, such as triaryl- and trialkylphosphine oxides, or a mixture of a lithium salt with a trialkylphosphine oxide compound. Epoxide isomerizations using these catalyst systems, however, are reported to yield predominantly a ketone product, with only minor amounts of aldehyde being produced. Moreover, when a catalyst system consisting essentially of lithium perchlorate and a trialkylphosphine oxide has been employed, it has been supposed that a tertiary center in the epoxide moiety is necessary in order for any significant degree of rearrangement to carbonyl compounds to occur. Finally, the prior technology has stated that the use of triarylphosphine oxide compounds in the catalyst system produces slower reaction rates and lower yields than the use of trialkylphosphine oxide compounds in the system. To my knowledge, the rearrangement of α-epoxide compounds by the use of these catalyst systems has not been specifically considered.

BRIEF DESCRIPTION OF THE PRESENT INVENTION

The present invention provides a method for catalytically isomerizing α-epoxides to yield predominantly n-aldehydes with the concurrent production of a small amount of 2-ketone. In contrast to the proposals of the prior art, the present invention employs either an aryl- or alkylphosphine oxide-alkali metal perchlorate catalyst to rearrange α-epoxides lacking a tertiary center in the epoxide moiety.

Broadly described, the method of the present invention comprises heating the α-epoxide to be isomerized to a temperature of from about 50°C to about 250°C in the presence of a catalyst system consisting essentially of a trialkyl- or triarylphosphine oxide compound and an alkali metal perchlorate compound. The products of the rearrangement, n-aldehydes and 2-ketones, are then separated by any suitable method, such as simple distillation.

An object of the invention is to provide a process for producing good yields of n-aldehyde compounds from α-epoxides lacking a tertiary center in the epoxide moiety.

Another object of the invention is to provide a new method for catalytically rearranging α-epoxide compounds.

Other objects and advantages of the invention will become apparent as the following detailed description of the invention is considered.

DETAILED DESCRIPTION OF PREFERRED EMBODIMENTS OF THE INVENTION

The α-epoxide compounds used in the method of the invention can be substantially any α-epoxide compound which does not have a tertiary center in the epoxide moiety. The α-epoxide compounds which can be employed are represented as follows:

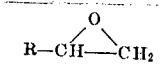

wherein R is a hydrocarbyl radical having 1 to 30 carbon atoms per radical. The term "hydrocarbyl" as employed herein includes the following radicals: alkyl, aryl, cycloalkyl, aralkyl, alkaryl, cycloalkylalkyl, and alkylcycloalkyl.

Examples of some suitable α-epoxide compounds include:

1,2-epoxypropane
1,2-epoxybutane
1,2-epoxydotricontane
1,2-epoxyoctane
1,2-epoxy-4-propyldecane
1,2-epoxy-26-phenylhexacosane
1,2-epoxy-1-(2-naphthyl)ethane
1,2-epoxy-1-cyclopentylethane
1,2-epoxy-1-cyclododecylethane
1,2-epoxy-3-phenylpropane
1,2-epoxy-3-(2-naphthyl)propane
1,2-epoxy-26-cyclohexylhexacosane
1,2-epoxy-3-cyclopentylpropane
1,2-epoxy-6-cyclododecylhexane
1,2-epoxy-1-(2-methylcyclopentyl)ethane
1,2-epoxy-1-(6-octadecylcyclododecyl)ethane The preferred α-epoxides, however, are those having the formula

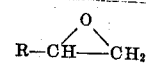

where R is an alkyl radical containing from 2 to 30 carbon atoms. The alkyl radical may be either branched or straight chain. Such compounds may conveniently be prepared by the oxidation of 1-olefin compounds.

The catalyst system used in the method of the invention consists essentially of a mixture of a phosphine oxide compound having the formula $R'_3PO$, where $R'$ is selected from the group consisting of aryl and alkyl radicals containing from 2 to 12 carbon atoms, and an alkali metal perchlorate compound. Typical phosphine oxide compounds useful in the catalyst system include triphenylphosphine oxide, tributylphosphine oxide, tribenzylphosphine oxide, and triisopropylphosphine oxide. The triarylphosphine oxides are preferred. The alkali metal perchlorate compound which is employed in the catalyst system may be derived from any of the alkali metals, but preferably is lithium perchlorate.

The two components of the catalyst system are mixed in a weight ratio to each other of from about 1 to 10 to about 10 to 1. Preferably, the two components of the catalyst system are combined in approximately a 1 to 1 mole ratio where the triarylphosphine oxide compounds are utilized. Where a trialkylphosphine oxide compound is employed, it is preferred to use a relatively high ratio of lithium perchlorate to the phosphine oxide compound. The catalyst system is utilized in an amount of from about 2 weight percent to about 20 weight percent, based on the weight of the α-epoxide to be treated.

Although it is usually preferred to use the catalyst system without solution in any type of solvent, and without dilution, solution or dilution is desirable under some circumstances. Where solution is to be effected, an amount of organic solvent up to 2000 weight percent, based on the weight of the α-epoxide, can be employed. Suitable solvents for the catalyst system of the invention include organic solvents having a boiling point higher than the epoxide compounds subjected to the process, and capable of dissolving the alkali metal perchlorate compound in the catalyst system. Typical solvents include, but are not limited to, benzene, diphenyl ether, tetrahydrofuran, and polyethers, such as glyme, diglyme and triglyme.

In carrying out the process of the invention, the catalyst system may be dissolved in a solvent of the type described, or no solvent may be utilized. The system is then heated with agitation to a temperature of from about 50°C to about 250°C. Preferably, the temperature to which the catalyst system is raised is from about 100°C to about 200°C. The α-epoxide is then added to the heated solution or catalyst system, and agitation is continued until the reaction is substantially complete. The products are then recovered by a suitable procedure, such as distillation. The reaction produces n-aldehyde and 2-ketone in a weight ratio of about 20 to 1.

The following example typifies the practice of the method of the invention. A catalyst system was prepared containing 1 gram of lithium perchlorate and 1 gram of triphenylphosphine oxide. The catalyst was dissolved with stirring in 130 ml of phenyl ether and this solution was heated to 143°C. At this point, 10 grams of 1,2-epoxyoctane was added to the catalyst solution. The reaction solution was then agitated at 143°C for 72 hours. Following this, the pot temperature was brought to 240°C, and volatiles were removed by short path distillation. Infrared analysis showed the presence of a carbonyl band in the crude distillate. NMR analysis showed a 20/1 ratio of n-aldehyde to 2-ketone present.

A further series of runs are made to further demonstrate the practice of the method of the invention. The runs are similar to the first run with 1,2-epoxyoctane, except that each of a series of compositions are employed in an amount which provides an amount of 1,2-epoxy moieties equivalent to the amount of 1,2-epoxy moieties provided by 10 grams of 1,2-epoxyoctane in the first run. Work up of products and analysis by infrared and nuclear magnetic resonance demonstrate that products analogous to the product of the first run are formed. A ratio of n-aldehyde to 2-ketone of about 20/1 is present as product.

The α-epoxide compounds employed include the following:
1,2-epoxypropane
1,2-epoxybutane
1,2-epoxydotricontane
1,2-epoxyoctane
1,2-epoxy-4-propyldecane
1,2-epoxy-26-phenylhexacosane
1,2-epoxy-1-(2-naphthyl)ethane
1,2-epoxy-1-cyclopentylethane
1,2-epoxy-1-cyclododecylethane
1,2-epoxy-3-phenylpropane
1,2-epoxy-3-(2-naphthyl)propane
1,2-epoxy-26-cyclohexylhexacosane
1,2-epoxy-3-cyclopentylpropane
1,2-epoxy-6-cyclododecylhexane
1,2-epoxy-1-(2-methylcyclopentyl)ethane
1,2-epoxy-1-(6-octadecylcyclododecyl)ethane This example demonstrates the process of the invention with a wide variety of α-epoxide compounds.

Although certain preferred embodiments of the invention have been herein described in order to exemplify the practice of the invention, and provide guidelines facilitating its use, it is to be understood that various changes and modifications can be effected in the described process parameters and conditions without departure from the basic principles of the invention. Changes and modifications of this type are therefore deemed to be circumscribed by the spirit and scope of the invention except as the same may be necessarily limited by the appended claims or reasonable equivalents thereof.

I claim:

1. A process of isomerizing an α-epoxide having the formula

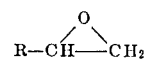

wherein R is an alkyl, aryl, cycloalky, aralkyl, alkaryl, cycloalkylalkyl, or alkylcycloalkyl radical having 1 to 30 carbon atoms per radical, to yield predominantly n-aldehydes, said process comprising contacting the α-epoxide at a temperature of about 50°C to about 250°C with a catalyst system consisting essentially of a compound having the formula R'$_3$PO, where R' is an alkyl or aryl radical having 2 to 12 carbon atoms per radical, and an alkali metal perchlorate compound, said catalyst system containing said first-mentioned compound and said perchlorate compound in a weight ratio to each other of 1:1 to 10:1

2. A process as defined in claim 1 wherein said α-epoxide is of the formula

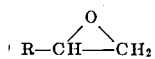

and wherein R is an alkyl radical having 2 to 30 carbon atoms.

3. A process for isomerizing an α-epoxide as defined in claim 1 wherein said catalyst system is present in an amount of from about 2 weight percent to about 20 weight percent, based on the weight of the α-epoxide to be treated.

4. A process for isomerizing an α-epoxide as defined in claim 1 wherein the α-epoxide is contacted with the catalyst system at a temperature of from about 100°C to about 200°C.

5. A process for isomerizing an α-epoxide as defined in claim 1 and further characterized to include the step of distilling the isomerization reaction product to separate aldehyde product from ketone product.

6. A process for isomerizing an α-epoxide as defined in claim 1 wherein said alkali metal perchlorate compound is lithium perchlorate.

7. A process for isomerizing an α-epoxide as defined in claim 2 wherein said compound having the formula R'$_3$PO is a triarylphosphine oxide compound, selected from the group consisting of triphenylphosphine oxide and tribenzylphosphine oxide.

8. A process for isomerizing an α-epoxide as defined in claim 1 wherein said catalyst system is dissolved in an organic solvent having a boiling point higher than the α-epoxide compound subjected to isomerization.

9. A process for isomerizing an α-epoxide as defined in claim 3 wherein said alkali metal perchlorate is lithium perchlorate.

10. A process for isomerizing an α-epoxide as defined in claim 9 wherein the compound having the formula $R'_3PO$ is triphenylphosphine oxide.

11. A process as defined in claim 10 wherein the α-epoxide is contacted with the catalyst system at a temperature of from about 100°C to about 200°C.

12. A process as defined in claim 1 wherein the α-epoxide is 1,2-epoxyoctane, wherein the compound having the formula $R'_3PO$ is triphenylphosphine oxide, wherein the alkali metal perchlorate is lithium perchlorate, and wherein the α-epoxide is contacted with the catalyst system at a temperature of 100°C to 200°C.

* * * * *